(No Model.)
P. SAAL.
BOTTLE FILLER.
No. 248,886. Patented Nov. 1, 1881.
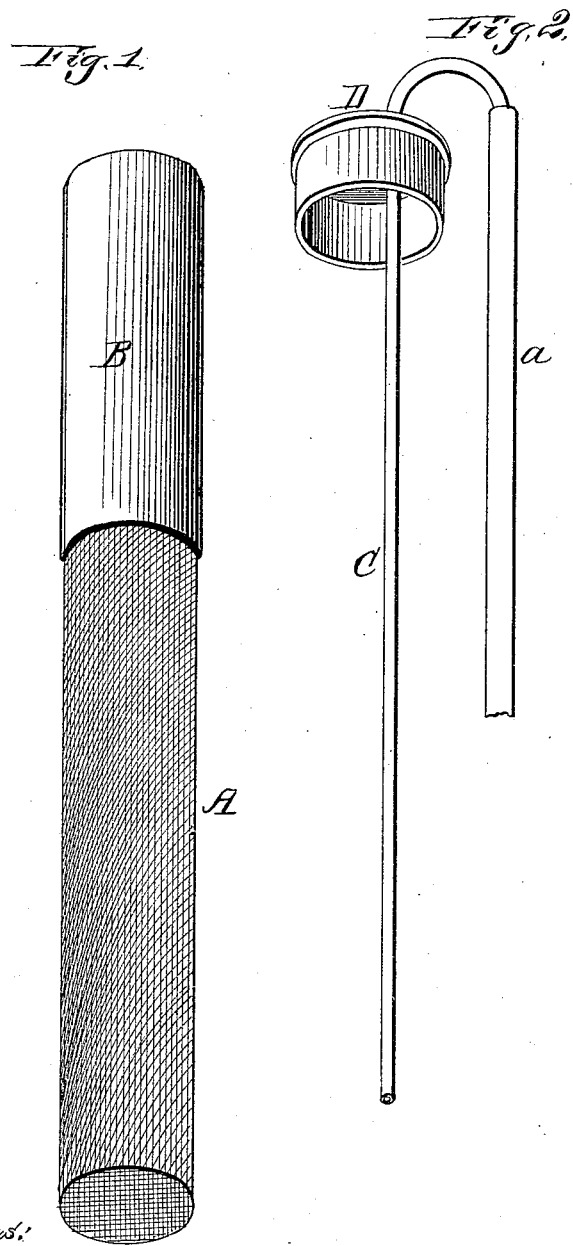
Witnesses:
W. C. McArthur,
L. S. Miller.
Inventor:
Peter Saal,
per Chas. H. Fowler
Attorney.

United States Patent Office.

PETER SAAL, OF GREENVILLE, PENNSYLVANIA.

BOTTLE-FILLER.

SPECIFICATION forming part of Letters Patent No. 248,886, dated November 1, 1881.

Application filed July 14, 1881. (No model.)

*To all whom it may concern:*

Be it known that I, PETER SAAL, a citizen of the United States, residing at Greenville, in the county of Mercer and State of Pennsylvania, have invented certain new and useful Improvements in Bottle-Fillers; and I do hereby declare that the following is a full, clear, and exact description of the same, reference being had to the annexed drawings, making a part of this specification, and to the letters and figures of reference marked thereon.

Figure 1 is a perspective view of the wire-gauze strainer connected to the stock for inserting it in the bung-hole of the barrel. Fig. 2 is a similar view of the siphon-tube, cap, and rubber tube disconnected from the strainer.

The present invention has relation to certain new and useful improvements in bottle-fillers; and it consists in the details of construction, substantially as shown in the drawings and hereinafter described.

In the accompanying drawings, A represents the strainer, of perforated metal or wire-gauze, in the form of a cylindrical tube closed at its bottom, or, in other words, having the wire-gauze covering its lower end. The upper end of the strainer A is connected to a metal stock, B, so that the strainer can be readily inserted in the bung-hole of the barrel and firmly held in place without danger of injury of the wire-gauze by compressing it.

Within the strainer A is inserted a siphon-tube, C, said tube being rigidly connected to a cap, D, through which it passes, the end above the cap being turned around and downward in the form of a goose-neck, and has connected to it a rubber extension-tube, *a*, of any desirable length.

In using the device, the tube after being inserted in the strainer A, and the cap D firmly secured over the stock B, the whole is introduced into the barrel through the bung-hole thereof. The liquor is first started to flow by suction or mechanically drawing it up through the tube C, after which it will continue to flow on the well-known siphon principle. In filling the bottles the rubber tube *a* is inserted in the neck thereof and the liquor flows through the tube into the bottle until filled.

If desired, instead of compressing the rubber-tube with the fingers to prevent the escape of the liquor, while changing it from one bottle to another, a suitable device may be connected to the tube for this purpose.

The strainer A entirely incloses the tube C, said tube extending down to near the bottom thereof, the strainer preventing any foreign substance from passing into the tube and stopping it up.

Having now fully described my invention, what I claim as new, and desire to secure by Letters Patent, is—

In a bottle-filler, the strainer A, connected to the stock B, in combination with the tube C, cap D, and rubber tube *a*, substantially as and for the purpose set forth.

In testimony that I claim the above I have hereunto subscribed my name in the presence of two witnesses.

PETER SAAL.

Witnesses:
D. R. SAUL,
B. McGOWAN.